United States Patent
Singh et al.

(10) Patent No.: US 12,530,267 B1
(45) Date of Patent: Jan. 20, 2026

(54) NOTEBOOK SNAPSHOT RESTORE IN A SERVERLESS SETTING

(71) Applicant: Databricks, Inc., San Francisco, CA (US)

(72) Inventors: Jaipreet Singh, Mercer Island, WA (US); Rohith Rokkam, Seattle, WA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/999,384

(22) Filed: Dec. 23, 2024

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
None
See application file for complete search history.

(56) References Cited

U.S. PATENT DOCUMENTS

| 11,422,668 B1* | 8/2022 | Hannemann | G06F 9/451 |
| 2025/0041720 A1* | 2/2025 | Fortuna | G06F 3/1431 |

* cited by examiner

*Primary Examiner* — Eddy Cheung
(74) *Attorney, Agent, or Firm* — Fenwick & West LLP (57) ABSTRACT

A data processing service monitors an activity status of a first set of computing devices that executes code in a notebook. The service may determine that the activity status of the first set of computing devices meets a termination condition. The service may generate, prior to termination of the first set of computing devices, a snapshot recording a current code execution progress for the notebook. To generate the snapshot, the service may determine serialized variables included in the current code execution progress and store the generated snapshot in a data store. The generated snapshot may include the determined serialized variables. The service may terminate the first set of computer devices from executing the code in the notebook.

20 Claims, 6 Drawing Sheets

```
┌─────────────────────────────────────────┐
│ Monitor an activity status of a first set of computing │
│ devices that executes code in a notebook │
│ 502 │
└─────────────────────────────────────────┘
                    │
                    ▼
┌─────────────────────────────────────────┐
│ Determine that the activity status of the first set of │
│ computing devices meets a termination condition │
│ 504 │
└─────────────────────────────────────────┘
                    │
                    ▼
┌─────────────────────────────────────────┐
│ Generate, prior to termination of the first set of │
│ computing devices, a snapshot recording a current │
│ code execution progress for the notebook │
│ 506 │
└─────────────────────────────────────────┘
                    │
                    ▼
┌─────────────────────────────────────────┐
│ Determine serialized variables included in the current │
│ code execution progress │
│ 508 │
└─────────────────────────────────────────┘
                    │
                    ▼
┌─────────────────────────────────────────┐
│ Store the generated snapshot comprising the │
│ determined serialized variables │
│ 510 │
└─────────────────────────────────────────┘
                    │
                    ▼
┌─────────────────────────────────────────┐
│ Terminate the first set of computing devices from │
│ execution the code in the notebook │
│ 512 │
└─────────────────────────────────────────┘
```

NOTEBOOK SNAPSHOT RESTORE IN A SERVERLESS SETTING

TECHNICAL FIELD

The disclosed configuration relates generally to data processing, and more particularly to storing and restoring snapshot of notebook in a serverless setting.

BACKGROUND

In serverless computing systems, a user typically submits their code or function requests, which are executed by managed services of a cloud provider. The managed services are operated through serverless systems, which are systems that manage and allocate compute resources without need for user to manage those resources. Serverless notebooks provide a fast and simple cluster-less experience. Computation is spun up automatically when a notebook is run, and transparently terminated when the notebook is idle.

In the current serverless systems, however, idle termination causes the user to lose any in-progress work in the notebook. For example, if a user runs a long query to read a table into a DataFrame (two-dimensional data structure spanning multiples of computers) and the process idles, serverless systems will look to shut down the session in order to conserve cloud system resources. Any in-progress work is flushed or deleted due to this shut down. This results in the user losing that DataFrame when the user returns. Accordingly, the user must start execution of the notebook from the beginning causing expenditure of more compute resources to run work product again.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The disclosed configurations provide a system (and/or a computer-readable medium or method/process) for generating a snapshot of a notebook. The configurations monitor an activity status of a first set of computing devices that executes code in a notebook. The configurations may determine that the activity status of the first set of computing devices meets a termination condition. The configurations may generate, prior to termination of the first set of computing devices, a snapshot recording a current code execution progress for the notebook. To generate the snapshot, the configurations may determine serialized variables included in the current code execution progress and store the generated snapshot in a data store. The generated snapshot may include the determined serialized variables. The configurations may terminate the first set of computer devices from executing the code in the notebook.

Figure 1:
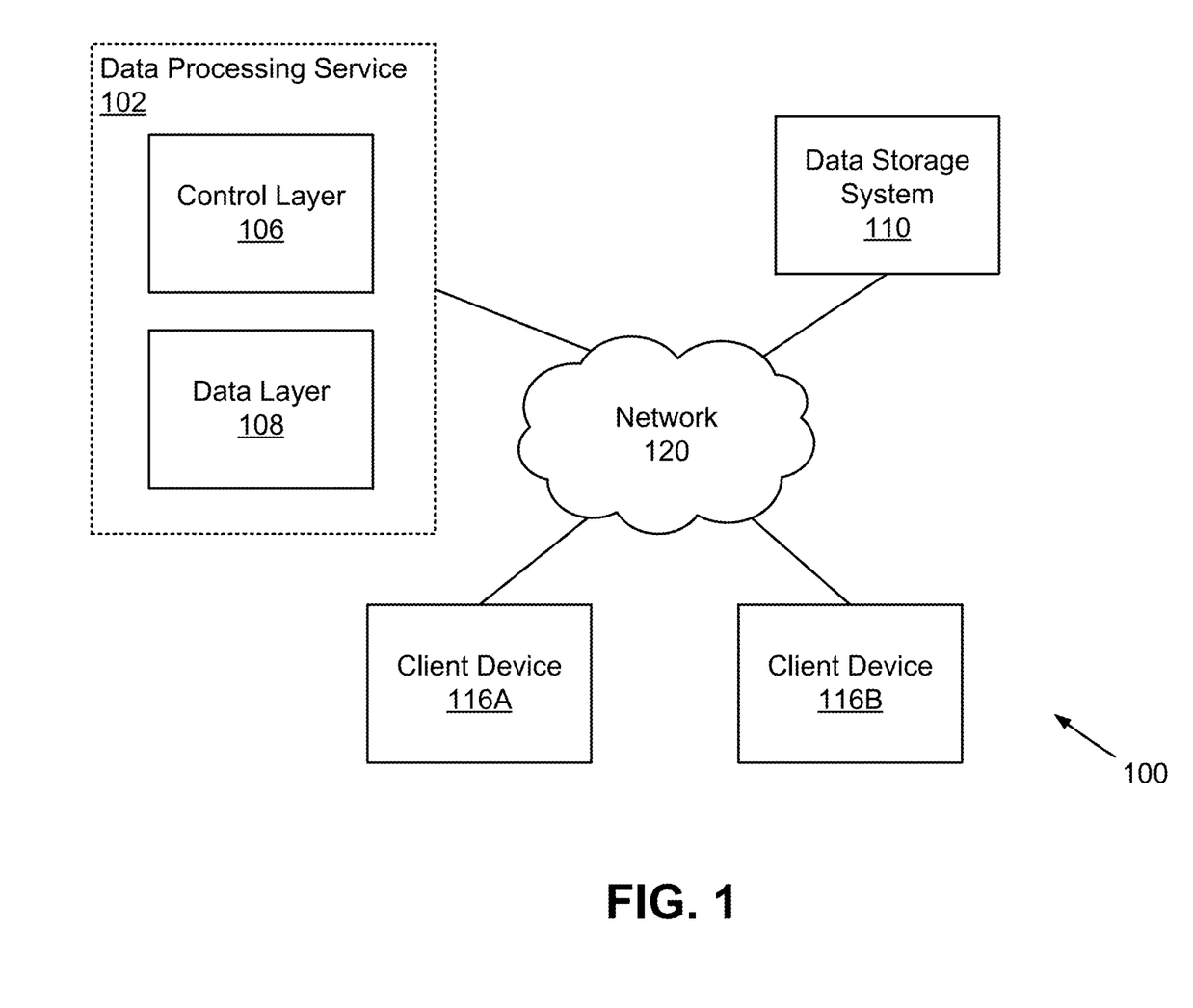
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 600 as described with FIG. 6.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In one embodiment, the computing resources of the data processing service 102 that access data in the data lake includes a transactional layer (e.g., group of software functionalities) that performs various functionalities, including retrieving the data relevant to the request, perform transaction management to update changes to a data table that comply with atomicity, consistency, isolation, and durability (ACID) transaction properties, and the like. The transactional layer may be configured within a compute resource of the control layer 106 and/or the data layer 108.

Moreover, since data in the data storage system 110 (e.g., cloud object data store) stores unstructured data in addition to structured data, it is difficult to interact with the data in a data lake compared to data stored in, for example, a structured database. Therefore, the transaction layer also generates and maintains one or more metadata files in association with the data files of a data table that allow the transaction layer to navigate the data storage system 110 to retrieve and write data desired by users. Therefore, the data files and/or metadata files of a data table may be stored according to different formats (e.g., schema, organization of files), and a compute resource is able to interact with the data if configured with the transactional layer for that format that includes, for example, libraries for reading or writing data in that format, and the like.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

Termination of computing clusters refers to the process of shutting down or disconnecting a group of interconnected computers, or "nodes," that work together as a single system to handle complex computational tasks. These clusters are often used in high-performance computing, data science, machine learning, and other data-intensive applications to provide the processing power needed for large-scale workloads. Termination can occur for several reasons, including the completion of tasks, cost savings, and resource reallocation. When a computing cluster is terminated, all resources associated with the cluster—such as compute nodes, storage, and networking—are either powered down or released back into the resource pool (in a cloud environment). This process essentially disbands the cluster, making those resources available for other uses. Termination can be performed manually by an administrator or automatically based on predefined policies, such as when the cluster is idle (not actively processing tasks) or when it reaches a specified end time. Idle termination refers to the automatic shutdown or disconnection of computing clusters that are not actively engaged in processing tasks. When a computing cluster is idle, it is essentially in a standby state, without any active workloads. This can happen if all tasks in the queue have been completed, if there are no jobs pending, or if resources are allocated but remain unused.

Current data processing services often implement idle termination policies for cost savings, especially in cloud computing environments where clusters incur charges based on active usage time. By terminating idle clusters, organizations can reduce expenses by avoiding charges for unused computational power. Moreover, idle termination also optimizes resource usage. When resources are freed up by terminating idle clusters, other tasks can be processed more efficiently, reducing the likelihood of bottlenecks in shared environments.

However, idle termination may be problematic for users working in interactive sessions, such as notebooks, where unsaved or in-progress work may be lost if the session shuts down due to inactivity. In serverless notebooks, users establish a session that enables them to interact with a temporary compute instance for activities like data analysis or machine learning experiments. During these interactive sessions, a user might pause to review outputs, adjust code, or conduct additional research. If the system detects a period of inactivity, it could interpret this as idle time and proceed with shutting down the session to free up resources. When this happens, any unsaved work, outputs, or data stored in memory are lost, including intermediate results or code outputs that haven't been saved to persistent storage.

In some embodiments, the disclosed configurations provide a snapshot mechanism to address this issue. Prior to a serverless notebook terminates due to idleness, the data processing service 102 automatically takes a snapshot, which records the memory state before termination. When a user reestablishes their session, the system re-attaches the notebook to the serverless computing resources, the data processing service 102 restores the notebook from the recorded snapshot, allowing the user to continue their work where they left off.

The snapshot mechanism significantly enhances the speed at which users can resume their work when reattaching a notebook after a period of inactivity. Instead of waiting for the entire notebook to re-execute, the snapshot allows for rapid restoration of variables, data, and the execution context, reducing the latency during recovery. This is particularly beneficial in scenarios where large datasets, complex machine learning models, or distributed computations are involved. By quickly restoring the previous state, users can pick up exactly where they left off without unnecessary delays, leading to a smoother and faster workflow. This efficiency not only saves time but also reduces the operational overhead associated with re-executing long-running tasks or workflows.

By terminating idle notebooks and capturing a snapshot of the memory state, serverless computing environments ensure that computational resources, such as CPUs and memory, are not wasted during inactivity. This results in cost savings, as serverless platforms typically charge based on actual usage. Without the snapshot mechanism, users might need to re-run entire notebooks upon reattaching, which could lead to significant resource consumption, especially for long-running or complex computations. The snapshot allows users to restore their exact working state, avoiding the need to re-execute computationally expensive tasks and leading to substantial cost-efficiency in large-scale, multi-user environments.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 600 as described with FIG. 6.

In one embodiment, a client device 116 executes an application allowing a user of the client device 116 to interact with the various systems of the system environment 100 of FIG. 1. For example, a client device 116 can execute a browser application to enable interaction between the client device 116 and the control layer 106 via the network 120. In another embodiment, the client device 116 interacts with the various systems of the system environment 100 through an application programming interface (API) running on a native operating system of the client device 116, such as IOS® or ANDROID™.

Figure 2:
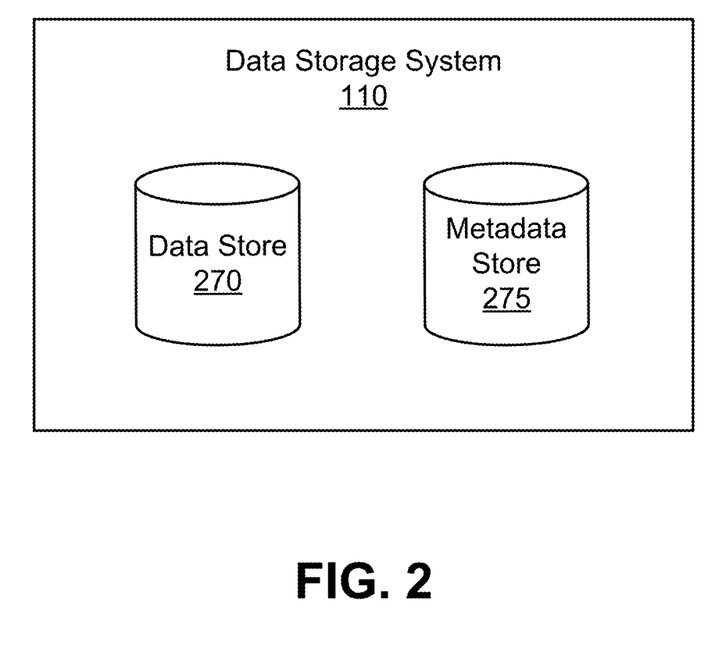
FIG. 2 illustrates a block diagram of an architecture of a data storage system, in accordance with an embodiment.

FIG. 2 is a block diagram of an architecture of a data storage system 110, in accordance with an embodiment. In one embodiment, the data storage system 110 includes a data ingestion module 250. The data storage system 110 also includes a data store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 110. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

In one embodiment, the transaction log for a data table in the metadata store 275 includes one or more log files (e.g., JSON files) that capture a transaction to the data table. A log file may include details of one or more transactions made to a respective set of data files of the data table. For example, the log may include the name of the data file, statistics of the data file including min-max ranges for a set of keys, size of the data file, type of transaction (e.g., write, add, update) committed, and the like. The metadata store 275 may also store one or more checkpoint files for the data table. Specifically, a set of checkpoint files describes the state of a data table at a given point in time by analyzing the transactions recorded in the log files until that time. Therefore, metadata for a data table may be characterized by a set of checkpoint files and one or more log files that describe transactions to the data table committed after the set of checkpoint files were created.

In some embodiments, the data store 270 may be configured to store a snapshot of a notebook. The snapshot may record a current code execution progress of the notebook before the computing clusters terminate. The metadata associated with the snapshot may be stored in the metadata store 275, and the metadata may be used to describe information of the associated snapshot. In some embodiments, the metadata may include a location identifier for identifying a storage location of the snapshot in the data store 270.

Figure 3:
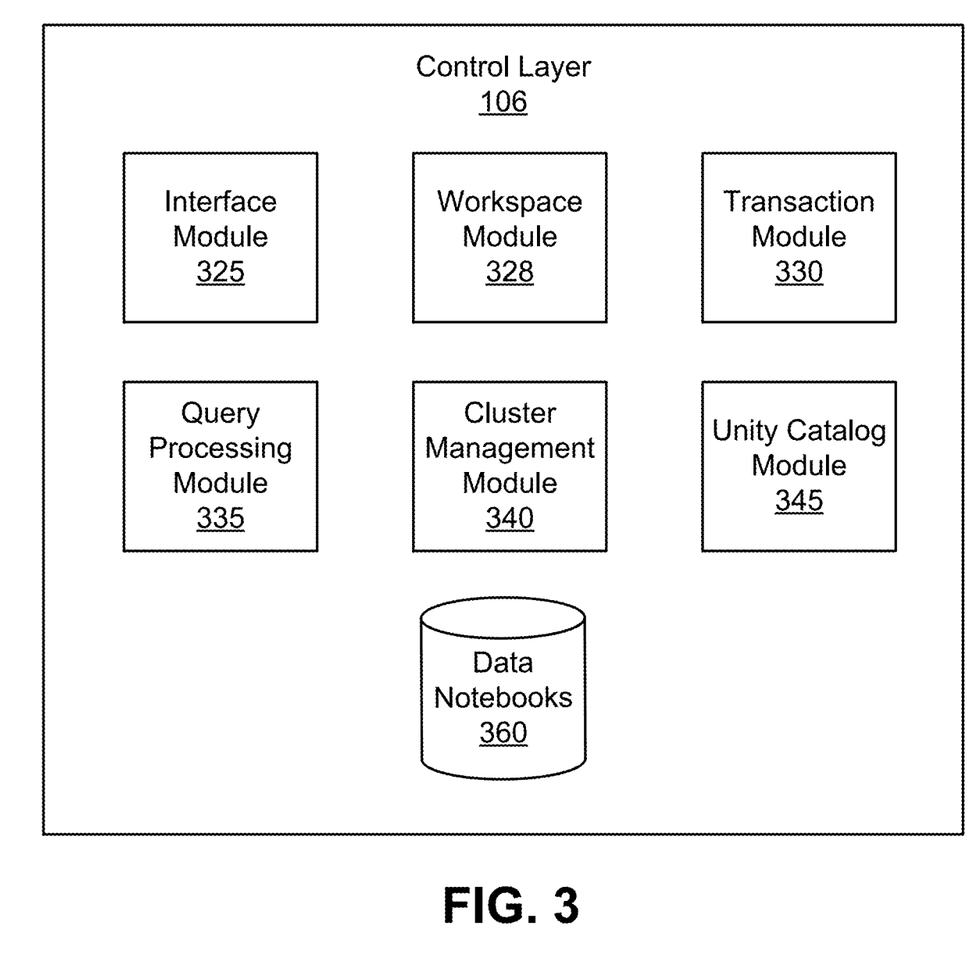
FIG. 3 illustrates a block diagram of an architecture of a control layer, in accordance with an embodiment.

FIG. 3 is a block diagram of an architecture of a control layer 106, in accordance with an embodiment. In one embodiment, the control layer 106 includes an interface module 325, a transaction module 330, a query processing module 335, and a cluster management module 340. The control layer 106 also includes a data notebook store 360. The modules 325, 330, 335, and 340 may be structured for execution by a computer system, e.g., 600 having some or all of the components as described in FIG. 6, such that the computer system 600 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the interface module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

Notebook Snapshot and Restore

Figure 4:
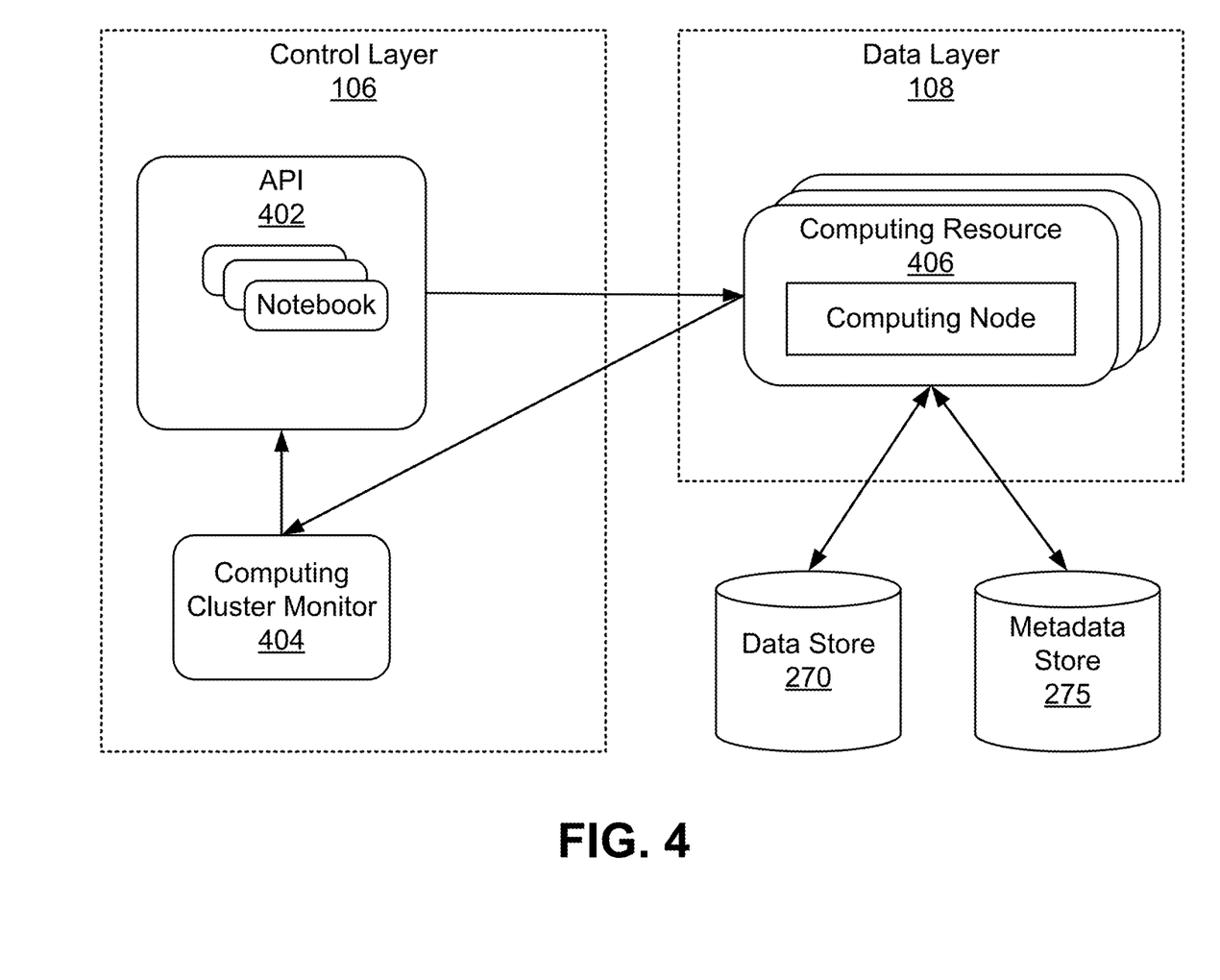
FIG. 4 is a block diagram of an architecture of the control layer and the data layer for performing snapshot restore, in accordance with an embodiment.

FIG. 4 is a block diagram of an architecture of the control layer 106 and the data layer 108 for snapshot restore, in accordance with an embodiment. The control layer 106 may include an application programming interface (API) 402 and a computing cluster monitor 404. The data layer 108 may include a plurality of computing clusters 406, a data store (e.g., data store 270) and a metadata store 410 (e.g., metadata store 275). The components included in the control layer 106 and data layer 108 may be structured for execution by a computer system, e.g., 600 having some or all of the components as described in FIG. 6, such that the computer system 600 operates in a specified manner as per the described functionality.

The API 402 provides an interface where users of the client devices 116 can access resources of the data processing service 102. In some implementations, the API 402 may run on a native operating system of the client devices 116. In one example, the API 402 may be a web-based interface associated with one or more notebooks. A notebook may include executable (e.g., runnable) code, visualizations, libraries, dependencies, etc. The API 402 provides an interface for users to write, execute, and visualize code included in the one or more notebooks. For example, a notebook may be executed by one or more computing clusters 406.

The computing cluster monitor 404 tracks the status of the computing clusters 406 for execution of a notebook. The computing cluster monitor 404 may determine whether the activity status of the computing clusters 406 meets a termination condition, e.g., an idle termination condition. In some implementations, the termination condition may include inactivity timeout, lack of active interaction from user, no queued jobs/tasks, low CPU or memory usage (for example, CPU and memory usage fall below a specific threshold, e.g., less than 5% utilization), session time limits, etc. For example, the computing cluster monitor 404 may monitor the activity levels, resource usage, and execution status of jobs running on the computing clusters 406. In some implementations, the computing cluster monitor 404 may detect a drop in activity, such as, no tasks have been submitted for a certain amount of time, all job have been completed, the computing cluster is of inactivity for a certain amount of time (e.g., more than 30 minutes), and the like, the computing cluster monitor 404 may determine that one or more computing clusters 406 for executing the notebook are about to become idle (e.g., no active jobs or tasks). The computing cluster monitor 404 may transmit (or send) a signal or transmit an instruction to the computing clusters 406 to take a snapshot to record a current code execution progress of the notebook.

The computing clusters 406 provide computational resources necessary to execute the code in the one or more notebooks. In some embodiments, the computing clusters 406 may include one or more computing nodes and/or one or more sets of computing devices, and each computing node may be associated with a notebook. In some embodiments, a computing cluster 406 includes a driver node and a worker pool including multiple worker nodes. The driver node receives one or more jobs in a notebook for execution, divides a job into job stages, and provides job stages to worker nodes, receives job stage results from the worker nodes of the worker pool, and assembles job stage results into complete job results, and the like. The driver node 522 may generate an execution plan. The driver node distributes information of the functions including the generated code to the worker nodes. The worker nodes execute the functions based on the received information. In some implementations, the driver node is the central coordinator that manages the execution of the functions/jobs.

The worker pool can include any appropriate number of worker nodes (e.g., 4 worker nodes, 12 worker nodes, 256 worker nodes). Each worker node in the worker pool includes one or more execution engines (not shown) for executing one or more tasks of a job. In one embodiment, an execution engine performs single-threaded task execution in which a task is processed using a single thread of the CPU. The worker node distributes one or more tasks for a job stage to the one or more execution engines and provides the results of the execution to the driver node. According to an embodiment, a worker node executes the generated code for the notebook. The worker nodes execute the functions/jobs based on the received information from the driver node.

In some embodiments, the computing clusters 406 receive the signal/instruction from the computing cluster monitor 404 to take a snapshot of the current code execution progress for the notebook. In some implementations, the computing cluster 406 may capture the current memory and execution state of the notebook before the computing cluster 406 terminates. The execution "state" or execution "progress" may include variables, objects, data structures, and any other information necessary to continue the notebook's execution later. The snapshot of the current code execution progress may include variables, data structures, values stored in the variable, the state of the data structures, such as DataFrames, lists, dictionaries, and other objects that are held in memory. The snapshot may include execution context, such as information about the active tasks, stages, or jobs in the current execution process, including status of computations being processed in the serverless environment. In some embodiments, the snapshot may include intermediate results or cached data that have been created during the execution of the notebook. In this way, the current code execution progress for the notebook may be stored, allowing the user to resume the progress of the execution of the notebook from where the computing cluster 406 goes to idle termination, instead of rerunning the entire notebook from the beginning.

In some embodiments, the computing cluster 406 determines serialized variables in the current execution state of a notebook. For example, the computing cluster 406 may identify which variables in the notebook's memory can be converted into a serialized format for efficient storage or transmission. Serialization may refer to a process of converting an object or data structure (like variables, DataFrames, or models) into a format that can be stored or transmitted (like JSON, binary, or pickle) and later reconstructed back into its original form. In distributed computing clusters, variables may be serialized and sent to worker nodes for parallel processing. For example, when a variable or function is determined on a driver node, it may need to be serialized and sent to the worker nodes that process data.

In some implementations, the computing clusters 406 may generate metadata for describing the information of the snapshot. In some examples, the metadata may include information for identifying the associated snapshot in the data store 408. For example, the metadata may include an identifier for identifying the snapshot, a location identifier for identifying a storage location of the snapshot in the data store 408, and the like. In one example, the metadata may include a pre-determined uniform resource locator (URL) for identifying a location of the stored snapshot in the data store 408. For example, the metadata may include pre-determined URLs for uploading and downloading the snapshot. In some implementations, the URLs allow the users to securely upload the snapshot to the data store 408 without directly handling storage credentials. The URLs may also include time-limited restrictions for the upload and download operations. Using the metadata (e.g., the pre-determined URL), the computing clusters 406 may upload the snapshot of the notebook to the data store 408. The computing clusters 406 may then be terminated (e.g., becomes idle) and removed from the execution of the notebook.

In some implementations, the data store 408 may be the data store 270 of the data storage system 110; alternatively, the data store 410 may be a separate data store. In some embodiments, the metadata store 410 may include metadata that describes information of the associated snapshot. In some implementations, the metadata store 410 may be the metadata store 275 of the data storage system 110; alternatively, the metadata store 410 may be a separate metadata store.

In some embodiments, the API 402 may receive a request from a user of the notebook, requesting the data processing service 102 to resume the execution of the notebook. Upon receiving the request, the data processing service 102 may assign a new set of computing clusters 406 for executing the notebook. The new set of computing clusters may be different from the previous computing clusters that executed the notebook. The computing clusters 406 may access the metadata store 410 and determine whether a snapshot associated with the notebook is stored in the data store 408. For example, the computing clusters 406 may determine whether metadata associated with the snapshot of the notebook exists in the metadata store 410. If the computing clusters 406, by checking the associated metadata in the metadata store 410, determine that a snapshot associated with the notebook exists in the data store 408, the computing clusters 406 may use the metadata to determine a storage location of the snapshot in the data store 408, e.g., a pre-determined URL for identifying a location of the stored snapshot in the data store 408. The computing clusters 406 then uses the storage location (e.g., pre-determined URL) to download the stored snapshot from the data store 408.

In some embodiments, once downloading the stored snapshot, the computing clusters 406 may resume the execution of the notebook using the stored snapshot. The snapshot may include serialized variables in the execution state of the notebook at the time when the snapshot was taken. The computing clusters 406 may resume the execution by deserialize the serialized variables. Deserialization may "reconstruct" objects from a stored representation so they can be used in computations, analyses, or workflows. In some implementations, the computing clusters 406 may covert data/values stored in a serialized format (such as binary, JSON, or other formats) back into its original structure or object form within a program's memory. For example, the computing clusters 406 may load an object back into memory from a serialized format and reconstruct the code execution progress for the notebook that is recorded in the snapshot, e.g., parsing text-based formats, reconstructing binary-encoded data into original object, and the like. Once the code execution progress for the notebook is reconstructed, the computing clusters 406 may resume the execution of the notebook from the execution progress right before the previous idle termination.

In some embodiments, the snapshot stored in the data store 408 may be associated with an expiration condition. The computing clusters 406 may use the metadata to determine whether a stored snapshot meets the expiration condition. In some embodiments, the expiration condition may be a time to live (TTL) for removing/cleaning the stored snapshot from the data store 408. TTL refers to the amount of time that stored snapshot is set to exist before removal. For example, a TTL may be set to be as a preset value, e.g., 6 months. In some implementations, the metadata associated with a stored snapshot may include a timestamp. Once the expiration condition is met, the store snapshot may be removed from the data store 408.

In some embodiments, the metadata of the stored snapshot may include a version number indicating a version of the stored snapshot in the data store 408. When downloading the stored snapshot, the computing clusters 406 may determine whether a current version number of the stored snapshot is different from a previous version number of the stored snapshot which was previously downloaded. Responsive to the current version number being different from the previous version number, the computing clusters 406 may download the stored snapshot with the current version number. If the current version number is the same as the previous version number, the computing clusters 406 may directly use the previously downloaded snapshot to resume the execution of the notebook.

Process of Notebook Snapshot

Figure 5:
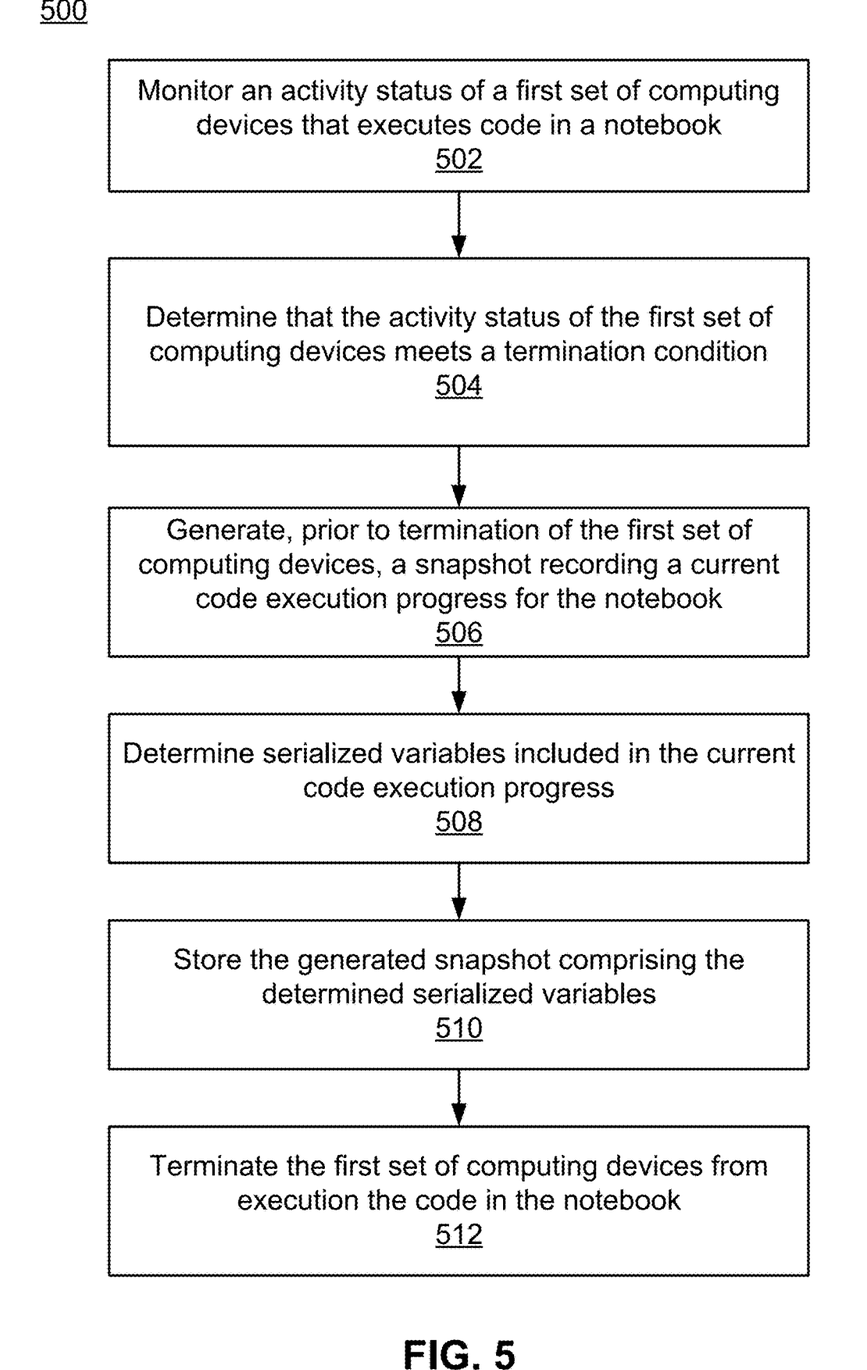
FIG. 5 is a flowchart of a method for generating a snapshot for a notebook prior to idle termination, in accordance with an embodiment.

FIG. 5 is a flowchart of a method for generating a snapshot for a notebook prior to idle termination, in accordance with an embodiment. The process shown in FIG. 5 may be performed by one or more components of a data processing system/service (e.g., the data processing service 102). Other entities may perform some or all of the steps in FIG. 5. The data processing service 102 as well as the other entities may include some or of the component of the machine (e.g., computer system) described in conjunction with FIG. 6. Embodiments may include different and/or additional steps or perform the steps in different orders.

As shown in FIG. 5, the data processing service 102 may monitor 502 an activity status of a first set of computing devices that executes code in a notebook. The data processing service 102 determines 504 that the activity status of the first of computing devices meets a termination condition. For example, the computing cluster monitor 404 may monitor the activity levels, resource usage, and execution status of jobs running on the computing clusters 406. The monitoring may include determining whether the activity level is below a predefined threshold. Further, the determination of this activity may signal for the data processing service 102 of the drop below the threshold level. As the drop below the threshold level may mean a termination process will begin, prior to the termination of the first set of computing devices, the data processing service 102 may generate 506 a snapshot recording a current code execution progress for the notebook. In some embodiments, the data processing service 102 may determine 508 serialized variables included in the current code execution progress and store 510 the generated snapshot in a data store. The snapshot may include the determined serialized variables. In some embodiments, the data processing service 102 may identify/determine a pre-determined uniform resource locator (URL) that identifies a storage location of the generated snapshot in the data store. The data processing service 102 uploads the generated snapshot in the data store using the pre-determined URL. The data processing service 102 may store metadata associated with the generated snapshot in a metadata store. The metadata specifies a storage location of the generated snapshot in the data store, for example, the metadata may include the pre-determined URL and/or an identifier to identify the snapshot. The data processing service 102 then terminates 512 the first set of computer devices from executing the code in the notebook. In some implementations, the data processing service 102 may monitor and determine whether a snapshot is generated and/or stored. For example, the data processing service 102 may wait for the completion of storing the snapshot. When determining that the snapshot is store, the data processing service 102 may signal the computing clusters to go idle. In some embodiments, the data processing service 102 may set a grace period for generating and storing the snapshot. Once the grace period ends, the computing cluster may be shut down/disconnected from the execution of the notebook automatically. In one instance, the data processing service 102 enters a predefined grace period for the snapshot to complete and be stored. During this grace period, the data processing service 102 initiates and monitors the snapshot, verifying whether it has successfully captured the necessary information and stored it in the data store. If any issues arise during the snapshot process, the data processing service 102 may retry within the grace period to ensure a complete and accurate snapshot. Once the snapshot is stored and the grace period concludes, the data processing service 102 may automatically proceed with the computing cluster shutdown (e.g., signaling the computing clusters to be disconnected from the execution of the notebook). Users may receive a notification alerting them to the computing cluster shutdown sequence and informing them that a snapshot has been safely stored. Additionally, the data processing service 102 may offer an optional override feature during the grace period, allowing users to halt the automatic termination if they need to resume work or conduct further processing. If no override is made, the shutdown proceeds as planned.

In some implementations, a user may request to resume the code execution of a notebook. The data processing service 102 may determine whether the snapshot of the notebook is stored in the data store. For example, the data processing service 102 may identify whether the metadata associated with the generated snapshot is stored in the metadata store. The metadata may include an identifier that identifies the associated snapshot. In some embodiments, the metadata may specify a storage location of the snapshot in the data store. For example, the metadata may include a pre-determined URL (e.g., download URL) for downloading the snapshot. If the data processing service 102 determines the metadata is stored in the metadata store, the data processing service 102 identifies the metadata and uses the metadata (e.g., URL) to identify the storage location of the snapshot in the data store. The data processing service 102 downloads the snapshot of the notebook from the identified storage location in the data store. The data processing service 102 downloads the stored snapshot at a second set of computing devices and resumes the code execution of the notebook using the second set of computing devices. In some implementations, when resuming the code execution, the data processing service 102 may retrieve the serialized variables in the stored snapshot, deserialize variables to generate the recorded code execution progress for the notebook and execute the code in the notebook based on the recorded coded execution progress.

Figure 6:
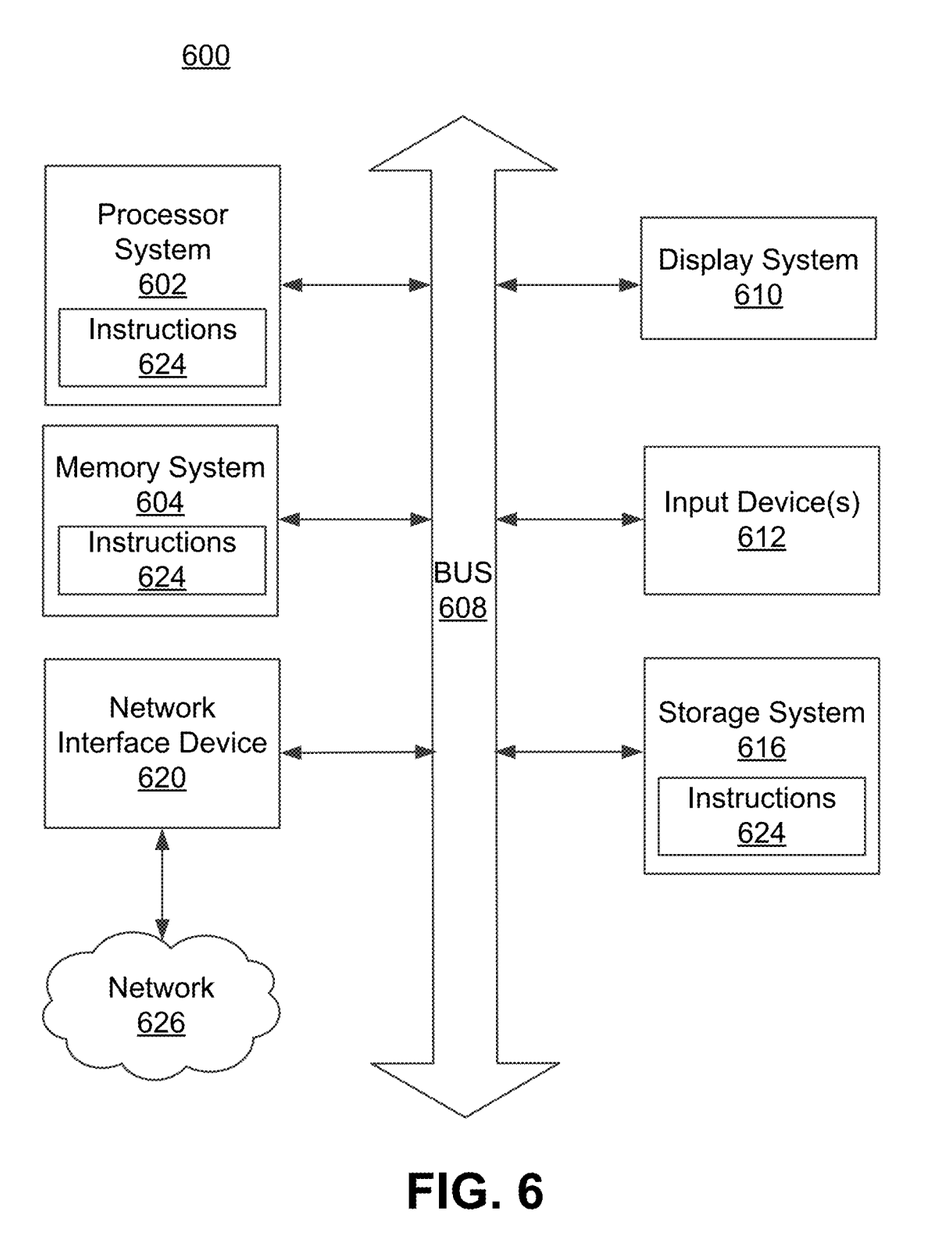
FIG. 6 is a block diagram illustrating an example machine to read and execute computer readable instructions, in accordance with an embodiment.

Turning now to FIG. 6, illustrated is an example machine to read and execute computer readable instructions, in accordance with an embodiment. Specifically, FIG. 6 shows a diagrammatic representation of the data processing service 102 (and/or data processing system) in the example form of a computer system 600, one or more components may be within the cluster computer systems. The computer system 600 is structured and configured to operate through one or more other systems (or subsystems) as described herein. The computer system 600 can be used to execute instructions 624 (e.g., program code or software) for causing the machine (or some or all of the components thereof) to perform any one or more of the methodologies (or processes) described with FIGS. 1-6 herein. In executing the instructions, the computer system 600 operates in a specific manner as per the functionality described. The computer system 600 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 600 may be a server computer, a client computer, a personal computer (PC), a tablet PC, a smartphone, an internet of things (IoT) appliance, a network router, switch or bridge, or other machine capable of executing instructions 624 (sequential or otherwise) that enable actions as set forth by the instructions 624. Further, while only a single machine is illustrated, the term "machine" shall also be taken to include any collection of machines that individually or jointly execute instructions 624 to perform any one or more of the methodologies discussed herein.

The example computer system 600 includes a processing system 602. The processor system 602 includes one or more processors. The processor system 602 may include, for example, a central processing unit (CPU), a graphics processing unit (GPU), a neural processing unit (NPU), a digital signal processor (DSP), a controller, a state machine, one or more application specific integrated circuits (ASICs), one or more radio-frequency integrated circuits (RFICs), or any combination of these. The processor system 602 executes an operating system for the computing system 600. The computer system 600 also includes a memory system 604. The memory system 604 may include or more memories (e.g., dynamic random access memory (RAM), static RAM, cache memory). The computer system 600 may include a storage system 616 that includes one or more machine readable storage devices (e.g., magnetic disk drive, optical disk drive, solid state memory disk drive).

The storage unit 616 stores instructions 624 (e.g., software) embodying any one or more of the methodologies or functions described herein. For example, the instructions 624 may include instructions for implementing the functionalities of the transaction module 330 and/or the file management module 335. The instructions 624 may also reside, completely or at least partially, within the memory system 604 or within the processing system 602 (e.g., within a processor cache memory) during execution thereof by the computer system 600, the main memory 604 and the processor system 602 also constituting machine-readable media. The instructions 624 may be transmitted or received over a network 626, such as the network 626, via the network interface device 620.

The storage system 616 should be taken to include a single medium or multiple media (e.g., a centralized or distributed database, or associated caches and servers communicatively coupled through the network interface system 620) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 600 can include a display system 610. The display system 610 may driver firmware (or code) to enable rendering on one or more visual devices, e.g., drive a plasma display panel (PDP), a liquid crystal display (LCD), or a projector. The computer system 600 also may include one or more input/output systems 612. The input/output (IO) systems 612 may include input devices (e.g., a keyboard, mouse (or trackpad), a pen (or stylus), microphone) or output devices (e.g., a speaker). The computer system 600 also may include a network interface system 620. The network interface system 620 may include one or more network devices that are configured to communicate with an external network 626. The external network 626 may be a wired (e.g., ethernet) or wireless (e.g., WiFi, BLUETOOTH, near field communication (NFC).

The processor system 602, the memory system 604, the storage system 616, the display system 610, the IO systems 612, and the network interface system 620 are communicatively coupled via a computing bus 608.

ADDITIONAL CONSIDERATIONS

The disclosed configurations provide a method (and/or a computer-readable medium or system) for generating a snapshot recording a current code execution progress of a notebook before the computing devices proceed to idle termination. Prior to a serverless notebook terminates due to idleness, the configuration takes a snapshot to record the memory state before termination. When a user comes back and re-attaches the notebook to the serverless computing resources, the configuration restores the notebook from the snapshot, allowing the user to continue their work where they left off.

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:
monitoring an activity status of a first set of computing devices that executes code in a notebook;
determining that the activity status of the first set of computing devices meets a termination condition;
generating, prior to termination of the first set of computing devices, a snapshot recording a current code execution progress for the notebook, wherein generating the snapshot further comprises:
determining serialized variables included in the current code execution progress; and
storing, in a data store, the generated snapshot comprising the determined serialized variables; and
terminating the first set of computer devices from executing the code in the notebook.

2. The method of claim 1, wherein storing the generated snapshot comprises:
determining a uniform resource locator (URL) identifying a storage location in the data store; and
storing the generated snapshot at the storage location by uploading the generated snapshot to the data store using the determined URL.

3. The method of claim 1, wherein storing the generated snapshot comprises:
storing, in a metadata store, metadata associated with the generated snapshot, the metadata specifying a storage location of the generated snapshot in the data store.

4. The method of claim 1, further comprising:
receiving a request from a user to resume the code execution in the notebook;
determining whether the snapshot of the notebook is stored in the data store by identifying, in a metadata store, metadata associated with the snapshot of the notebook;
responsive to determining that the snapshot of the notebook is stored in the data store, downloading, at a second set of computing devices, the stored snapshot of the notebook; and
resuming, at the second set of computing devices, the code execution of the notebook.

5. The method of claim 4, wherein resuming the code execution of the notebook comprises:
retrieving the serialized variables in the stored snapshot;
deserializing the variables to generate the recorded code execution progress for the notebook; and
executing, at the second set of computing devices, the code in the notebook based on the recorded coded execution progress.

6. The method of claim 4, wherein the metadata comprises a pre-determined download uniform resource locator (URL) that identifies a storage location of the snapshot in the data store.

7. The method of claim 6, wherein downloading the stored snapshot of the notebook comprises:
identifying, based on the metadata, the storage location of the snapshot in the data store; and
downloading, from the identified storage location, the snapshot of the notebook.

8. A non-transitory computer readable storage medium comprising stored instructions, the stored instructions when executed cause a processor system to:
monitor an activity status of a first set of computing devices that executes code in a notebook;
determine that the activity status of the first set of computing devices meets a termination condition;
generate, prior to termination of the first set of computing devices, a snapshot recording a current code execution progress for the notebook, wherein the instructions to generate the snapshot further comprises instructions to:
determine serialized variables included in the current code execution progress; and
store, in a data store, the generated snapshot comprising the determined serialized variables; and
terminate the first set of computer devices from executing the code in the notebook.

9. The non-transitory computer readable storage medium of claim 8, wherein the instructions to store the generated snapshot further comprises instructions that when executed cause the processor system to:
determine a uniform resource locator (URL) identifying a storage location in the data store; and
store the generated snapshot at the storage location by uploading the generated snapshot to the data store using the determined URL.

10. The non-transitory computer readable storage medium of claim 8, wherein the instructions to store the generated snapshot further comprises instructions that when executed cause the processor system to:
store, in a metadata store, metadata associated with the generated snapshot, the metadata specifying a storage location of the generated snapshot in the data store.

11. The non-transitory computer readable storage medium of claim 8, further comprising stored instructions that when executed cause the processor system to:
receive a request from a user to resume the code execution in the notebook;
determine whether the snapshot of the notebook is stored in the data store by identifying, in a metadata store, metadata associated with the snapshot of the notebook;
download, at a second set of computing devices, the stored snapshot of the notebook when determined that the snapshot of the notebook is stored in the data store; and
resume, at the second set of computing devices, the code execution of the notebook.

12. The non-transitory computer readable storage medium of claim 11, wherein the instructions to resume the code execution of the notebook further comprises instructions that when executed cause the processor system to:
retrieve the serialized variables in the stored snapshot;
deserialize the variables to generate the recorded code execution progress for the notebook; and
execute, at the second set of computing devices, the code in the notebook based on the recorded coded execution progress.

13. The non-transitory computer readable storage medium of claim 11, wherein the metadata comprises a pre-determined download uniform resource locator (URL) that identifies a storage location of the snapshot in the data store.

14. The non-transitory computer readable storage medium of claim 13, wherein the instructions to download the stored snapshot of the notebook further comprises instructions that when executed cause the processor system to:
- identify, based on the metadata, the storage location of the snapshot in the data store; and
- download, from the identified storage location, the snapshot of the notebook.

15. A system comprising:
one or more computer processors; and
one or more computer-readable mediums comprising stored instructions that, when executed by the one or more computer processors, cause the system to:
- monitor an activity status of a first set of computing devices that executes code in a notebook;
- determine that the activity status of the first set of computing devices meets a termination condition;
- generate, prior to termination of the first set of computing devices, a snapshot recording a current code execution progress for the notebook, wherein the instructions to generate the snapshot further comprises instructions that when executed cause the system to:
  - determine serialized variables included in the current code execution progress; and
  - store, in a data store, the generated snapshot comprising the determined serialized variables; and
- terminate the first set of computer devices from executing the code in the notebook.

16. The system of claim 15, wherein the instructions to store the generated snapshot further comprises instructions that when executed cause the system to:
- determine a uniform resource locator (URL) identifying a storage location in the data store; and
- store the generated snapshot at the storage location by uploading the generated snapshot to the data store using the determined URL.

17. The system of claim 15, wherein the instructions to store the generated snapshot further comprises instructions that when executed cause the system to:
- store, in a metadata store, metadata associated with the generated snapshot, the metadata specifying a storage location of the generated snapshot in the data store.

18. The system of claim 15, further comprising instructions that when executed cause the system to:
- receive a request from a user to resume the code execution in the notebook;
- determine whether the snapshot of the notebook is stored in the data store by identifying, in a metadata store, metadata associated with the snapshot of the notebook;
- download, at a second set of computing devices, the stored snapshot of the notebook when determined that the snapshot of the notebook is stored in the data store; and
- resume, at the second set of computing devices, the code execution of the notebook.

19. The system of claim 18, wherein the instructions to resume the code execution of the notebook further comprises instructions that when executed cause the system to:
- retrieve the serialized variables in the stored snapshot;
- deserialize the variables to generate the recorded code execution progress for the notebook; and
- execute, at the second set of computing devices, the code in the notebook based on the recorded coded execution progress.

20. The system of claim 18, wherein the metadata comprises a pre-determined download uniform resource locator (URL) that identifies a storage location of the snapshot in the data store, and the instructions to download the stored snapshot of the notebook further comprises instructions that when executed cause the system to:
- identify, based on the metadata, the storage location of the snapshot in the data store; and
- download, from the identified storage location, the snapshot of the notebook.

* * * * *